United States Patent [19]
Izumi et al.

[11] Patent Number: 6,070,683
[45] Date of Patent: Jun. 6, 2000

[54] POWER TRANSMISSION SYSTEM

[75] Inventors: Yoshio Izumi; Hitoshi Yokotani, both of Saitama, Japan

[73] Assignee: Honda Giken Kogyo Kabushiki Kaisha, Tokyo, Japan

[21] Appl. No.: 09/015,967

[22] Filed: Jan. 30, 1998

[30] Foreign Application Priority Data

Jan. 31, 1997 [JP] Japan .................................. 9-053787

[51] Int. Cl.$^7$ .......................... B62M 27/02; B62M 29/00; B62D 55/12
[52] U.S. Cl. ........................................... 180/190; 180/9.62
[58] Field of Search ................................... 180/190, 191, 180/193, 9.62, 9.64

[56] References Cited

U.S. PATENT DOCUMENTS

| 3,870,117 | 3/1975 | Larsen ................................ | 180/64 R |
| 4,301,884 | 11/1981 | Taylor ................................. | 180/190 |
| 5,304,012 | 4/1994 | Wendling ........................... | 403/274 |
| 5,533,585 | 7/1996 | Kawano et al. ................... | 180/190 |
| 5,582,501 | 12/1996 | Meyer ................................. | 414/491 |

FOREIGN PATENT DOCUMENTS 50-39291  12/1975  Japan .

*Primary Examiner*—Robert J. Oberleitner
*Assistant Examiner*—Jeffrey Woller
*Attorney, Agent, or Firm*—Birch, Stewart, Kolasch & Birch, LLP

[57] ABSTRACT

An arrangement for removably attaching a drive shaft of a track belt to an output shaft of a transmission allows the drive shaft to be mounted and removed easily and rapidly with respect to the output shaft. A driving pulley of a V-belt transmission is mounted on the right end of a crankshaft of an engine. A gear box is disposed proximately on the right side of a driven pulley of the transmission. An input shaft of the gear box supports the driven pulley. An input shaft, an idle shaft, and a final shaft are disposed in the gear box. The outer periphery of the output shaft is sealed with a seal. The output shaft is formed as a hollow shaft projecting and opening to one side of the gear box. The inner surface of the hollow output shaft is splined, and one end of the drive shaft is inserted into the hollow portion of the output shaft. Further, splines formed on the outer periphery of the one end of the drive shaft are brought into engagement with the splines formed on the inner surface of the output shaft. Thus, the splined connection permits rotation of the output shaft to be transmitted to the drive shaft, while allowing the drive shaft to be easily mounted to or removed from the output shaft.

10 Claims, 8 Drawing Sheets

# POWER TRANSMISSION SYSTEM

BACKGROUND OF THE INVENTION

1. Field of the Invention

The present invention relates to a power transmission suitable for use on a snowmobile, and more particularly, to an arrangement for removably attaching a drive shaft of a track belt to an output shaft of a transmission which allows the drive shaft to be easily and quickly assembled with the output shaft.

2. Description of the Background Art

Japanese Patent Publication No. 39291/75 discloses a snowmobile in which the driving force of an engine is transmitted to a drive shaft of an endless track unit through a V-belt transmission and a chain drive final reduction mechanism to drive the endless track unit. According to the snowmobile disclosed therein, an output-side sprocket is supported by a bearing within a chain case, and one end of a drive shaft for driving the endless track unit is splined to the output-side sprocket.

When the drive shaft is to be mounted or removed in such a chain case as in the above prior art, one must first remove a cover of the chain case, and then remove a fixing bolt for the output-side sprocket. This procedure is complicated and time-consuming.

SUMMARY OF THE INVENTION

In order to solve the above-mentioned problem, the present invention includes a power transmission system having a gear box wherein a plurality of gear shafts, including an input shaft and an output shaft, are supported through bearings. Power is transmitted by gears mounted on the gear shafts. An outer peripheral portion of the output shaft is sealed with an oil seal, and the output shaft is hollow. An inner surface of the hollow output shaft is splined, and one end of a drive shaft having a splined outer peripheral portion is inserted and connected removably into the hollow portion of the output shaft.

In the above construction, a cap member for sealing the hollow portion of the output shaft may be fitted in the output shaft on the side opposite to the side where the drive shaft is inserted.

Further, an opposite end portion of the drive shaft can be supported so as to prevent dislodgment thereof by a bearing portion mounted on a support member. The drive shaft can be used as a drive shaft for driving an endless track unit of a snowmobile.

Since the outer peripheral portion of the output shaft is sealed with an oil seal and the output shaft is hollow with an inner splined surface, even if lubricating oil is sealed within the gear box, there is no fear that oil will leak from around the output shaft. In mounting or removing the drive shaft, therefore, it is not necessary to disassemble the gear box. Merely inserting one end of the drive shaft which has a splined outer periphery into the hollow portion of the output shaft is all that is required. Removal of the drive shaft can also be done easily and rapidly.

A cap member may be fitted in the output shaft on the side opposite to the side where the drive shaft is inserted, allowing the hollow portion of the output shaft to be sealed easily.

One end of the drive shaft is splined to the output shaft, and an opposite end portion is fixed by clamping, for example, through a bearing portion mounted on a support member. Therefore, the opposite end portion is supported so as to prevent dislodgment thereof. Thus, attachment of the drive shaft can be performed at only one such opposite end portion. Accordingly, installation of the drive shaft becomes easier and more rapid.

Further, if the drive shaft is used as a drive shaft for driving an endless track unit in a snowmobile, the connection and separation between the gear box and the endless track unit can be performed freely and easily, so that the inspection and replacement of a track belt become easier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
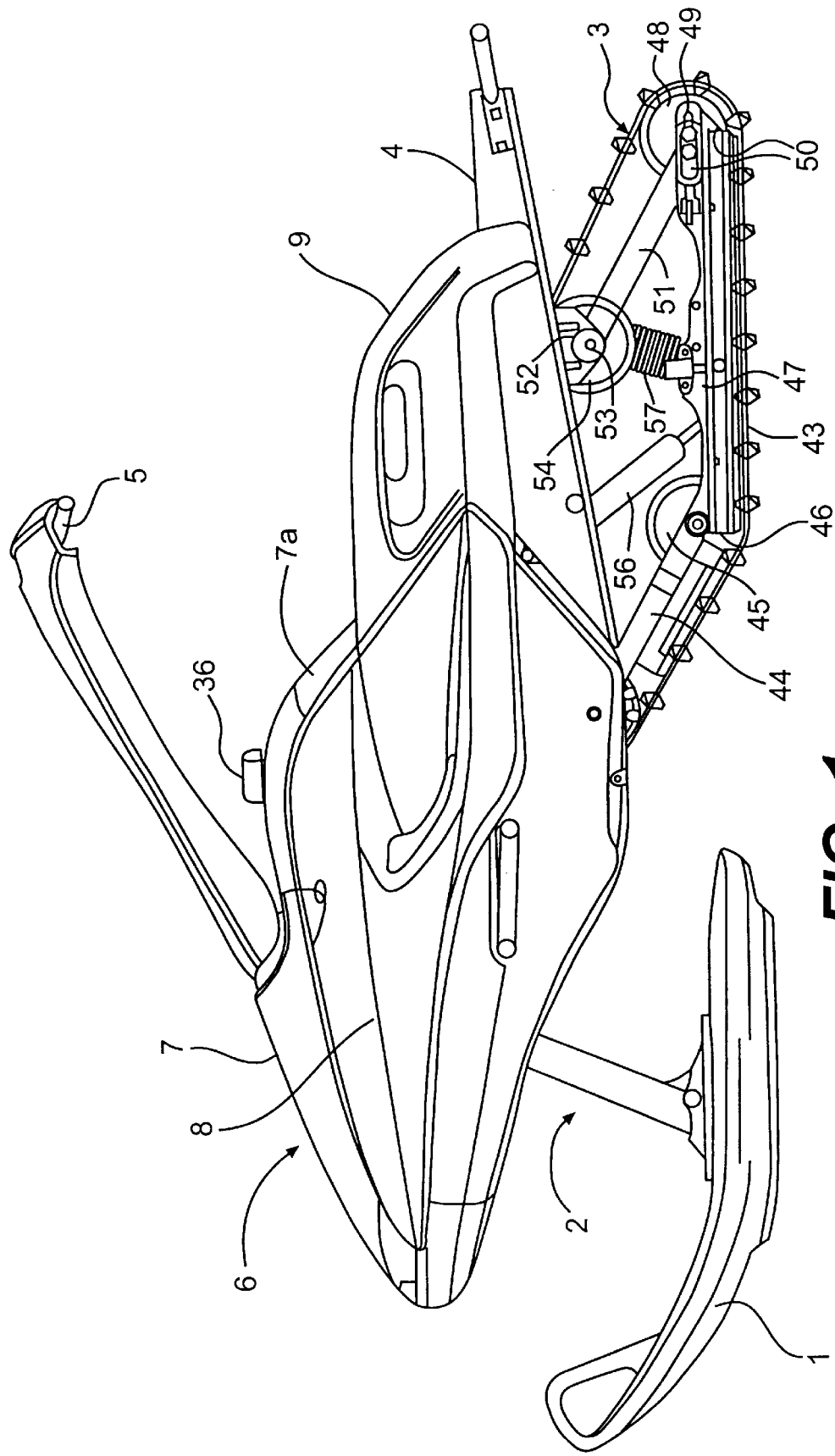
FIG. 1 is a side view of a snowmobile according to the present invention.

A schematic structure of the entire snowmobile will be first described with reference to FIGS. 1 and 2. The front body portion of the snowmobile includes a steering ski 1 supported by a telescopic erecting front suspension 2. The rear body of the snowmobile includes a track device 3 driven by an engine, which will be described in more detail later. A floor 4 is provided over the track device 3. A driver stands on the floor 4 and operates a handlebar 5 to steer the snowmobile. The floor 4 is formed into an approximately inverted U-shape viewed in transverse cross-section. Right and left side surfaces of the floor 4 are formed as vertical walls.

A body cover 6 includes a front cover 7, side covers 8, and a rear cover 9. The front cover 7 covers a portion extending rearwardly over an engine compartment at the front body. The side covers 8 cover portions of the body on both sides of the front cover 7. The rear cover 9 extends longer rearwardly from the side covers 8 along right and left sides of the floor 4 and covers side portions of a driver's space over the floor 4.

Figure 2:
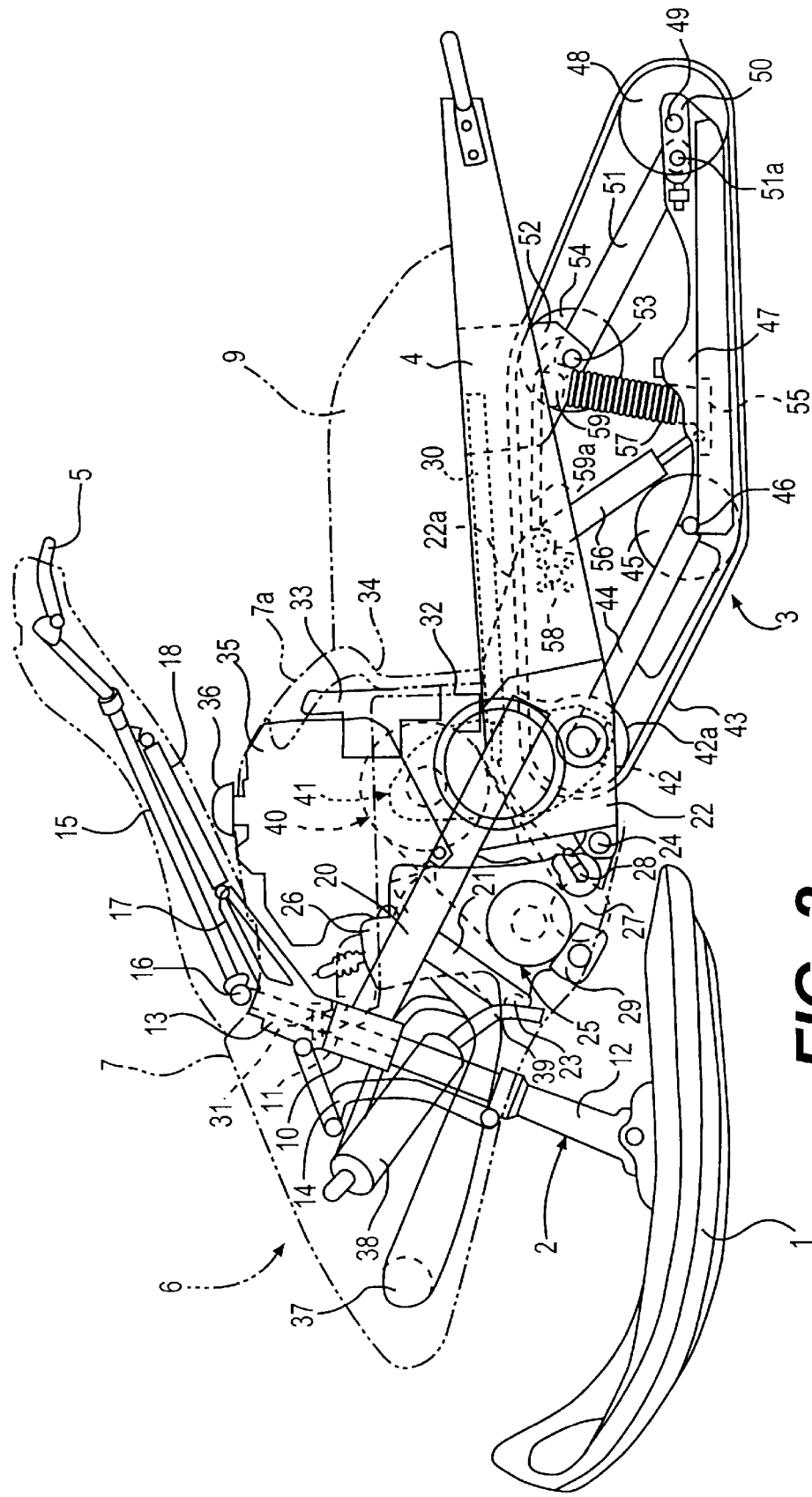
FIG. 2 is a side view of the snowmobile with the body cover removed therefrom.

As shown in FIG. 2, a head pipe 10 is provided at the front body. The front suspension 2 is fixedly surrounded by the head pipe 10. An inner tube 11 of the front suspension 2 extends obliquely in the vertical direction, with a lower end portion thereof rotatably supported by an outer tube 12.

A handle boss 13 is mounted around an outer periphery of an upper end portion of the inner tube 11 and rotatable with the inner tube The handle boss 13 is connected to the upper end portion of the outer tube 12 with a suspension link 14.

The suspension link 14 is extensible by vertical movement of the outer tube 12. An intermediate portion of the suspension link 14 projects forwardly to sufficiently ensure a chamber space (described later) surrounded by a portion of the body cover 6 and positioned in front of the head pipe 10.

A lower end portion of a handle post 15 is connected to a top portion of the handle boss, and is vertically rockable through a handle post pivot 16. A handle link 18 composed of a damper is mounted between a link stay 17 and a portion of the handle post 15 near the handlebar 5. The link stay 17 integrally extends obliquely upwardly and rearwardly from the top portion of the handle boss 13.

The front suspension 2, head pipe 10, and handle boss 13 form a steering shaft of the steering ski 1. The handle post pivot 16 is positioned between a rear end portion of the steering ski 1 and a front end portion of the track device 3.

Right and left main frames 20 extend obliquely downwardly and rearwardly from the head pipe 10. Each of the main frames 20 has a down-tube 21 and a pivot plate 22. The down-tube 21 extends downwardly from a portion of the main frame 20 near the head pipe 10. The pivot plate 22 extends downwardly from a rear portion of the main frame 20.

A water-cooled two-cycle single-cylinder engine 25 is supported on the body by elastic members 23 and 24 provided on the down-tubes 21 and the pivot plates 22, respectively. A cylinder portion 26 of the engine 25 is positioned between the right and left main frames 20 The center of the engine 25 is positioned at an approximately central portion of the body.

A water pump 28 and an oil pump 29 are provided on a lower portion of a crankcase 27 of the engine 25. The water pump 28 is used to supply cooling water from a heat exchanger into the cylinder portion 26. The heat exchanger 30 is contained in a ceiling portion of the floor 4. The cooling water from the cylinder portion 26 is fed to the heat exchanger 30 to be effectively cooled, and is then returned into the water pump 28. A water inlet 31 of the heat exchanger 30 is provided at the side of the head pipe 10.

The heat exchanger 30 has a width nearly equal to a width of the ceiling portion of the floor 4. Accordingly, the heat exchanger has a wide surface area. Also, the heat exchanger 30 is superimposed on the ceiling portion of the floor 4 in the vertical direction to mutually increase the rigidities of the heat exchanger 30 and the floor 4.

The oil pump 29 is connected to an oil tank 33 supported on an upper front portion of the floor 4 together with a battery 32. Maintenance of the battery 32 and the oil tank 33 can be performed by opening a lid 34 formed to a partitioning wall 7a which longitudinally partitions the driver's space over the floor 4 from the engine compartment in front of the driver's space.

The partitioning wall 7a is formed of a portion of the front cover 7 which curves around a back surface of a fuel tank 35 while covering an upper surface of the fuel tank 35. The fuel tank 35 is positioned in front of the battery 32 and the oil tank 33, and is supported on the main frames 20. A fuel tank cap 36 is located on the top of the fuel tank 35.

An exhaust chamber 37 extends forwardly from an exhaust port of the engine 25, and is arranged in the chamber space surrounded by the body cover 6 positioned in front of the engine 25. In the chamber space, the exhaust chamber 37 extends in the form of an approximately semicircular shape in a plan view along the inner surface of the body cover 6. A silencer 38 connected to the exhaust chamber 37 is disposed along the upper side of the exhaust chamber 37. The piping of the exhaust system thus meanders in an approximately two-stage manner. The exhaust gas is exhausted downwardly toward the front side of the engine 25 from a tail pipe 39.

The drive output of the engine 25 is transmitted through a V-belt transmission 40 to a gear box 41 containing a final reduction gear mechanism. The gear box 41 is supported on the main frames 20 and the pivot plates 22, and is adapted to reduce the drive speed transmitted from the V-belt transmission 40 and to rotate a drive shaft 42.

Drive wheels 42a are integrally supported by the drive shaft 42, and are rotated integrally with the drive shaft 42. Outer peripheral portions of the drive wheels 42a are meshed with concave and convex irregularities formed on the inner surface of a track belt 43 for driving the track belt 43.

The left end portion of the drive shaft 42 is supported by the pivot plate 22, and the right end portion is supported by the gear box 41. Front end portions of a pair of right and left rear arms 44 extend obliquely downwardly and rearwardly from the drive shaft 42. The right and left rear arms 44 are rotatably supported around both end portions of the drive shaft 42. Both rear end portions of the rear arms 44 are connected to front end portions of right and left side rails 47 extending parallel to each other through an idle shaft 46 of an idle wheel 45.

Shaft position adjusting plates 50 for supporting the idle shaft 49 of the idle wheel 48 are supported by both rear end portions of the side rails 47, and are movable fore and aft. A lower end portion of a rear link 51 disposed in parallel to the rear arm 44 is connected to each shaft position adjusting plate 50 through a connecting member 51a.

An upper end portion of the rear link 51 is rotatably mounted to a stay 52 projecting downwardly from a side surface of the floor 4 through an idle shaft 53. A track belt 43 is wound around idle wheels 54 supported by the idle shaft 53, additional idle wheels 46 and 48, and the drive wheels 42a supported by the drive shaft 42, to constitute the track device 3.

The track device 3 forms a parallelogram link formed of the floor 4, rear arms 44, side rails 47, and rear links 51. A cross-plate 55 is formed between intermediate portions of the right and left side rails 47. A damper 56 and a suspension spring 57, which constitute a rear suspension, extend obliquely vertically from the cross-plate 55, and widen toward the upper side in an inverted V-shape when viewed from the side.

An upper end portion of the damper 56 is supported by a cross-pipe 58. The cross-pipe is supported between right and left extensions 22a extending rearwardly in the floor 4 from rear portions of the pivot plates 22. An upper end portion of the suspension spring 57 is supported by a spring holder 59, which is pivotally supported by the idle shaft 53. The spring holder 59 is supported by a rear end portion of a spring holder rod 59a. The spring holder rod 59a extends rearwardly with its front end fastened with an upper end portion of the damper 56.

Next, a detailed discussion of the drive/power transmission system will be made with reference to FIGS. 3 to 8. The drive/power transmission system includes the engine 25, V-belt transmission 40 and gear box 41, which are disposed in an approximately N-shape (see FIG. 5). As shown in FIG. 4, the engine 25 is a two cycle engine which draws in air through a carburetor 19 and into a crankcase 27. The air is preliminarily compressed in the crankcase 27.

Figure 3:
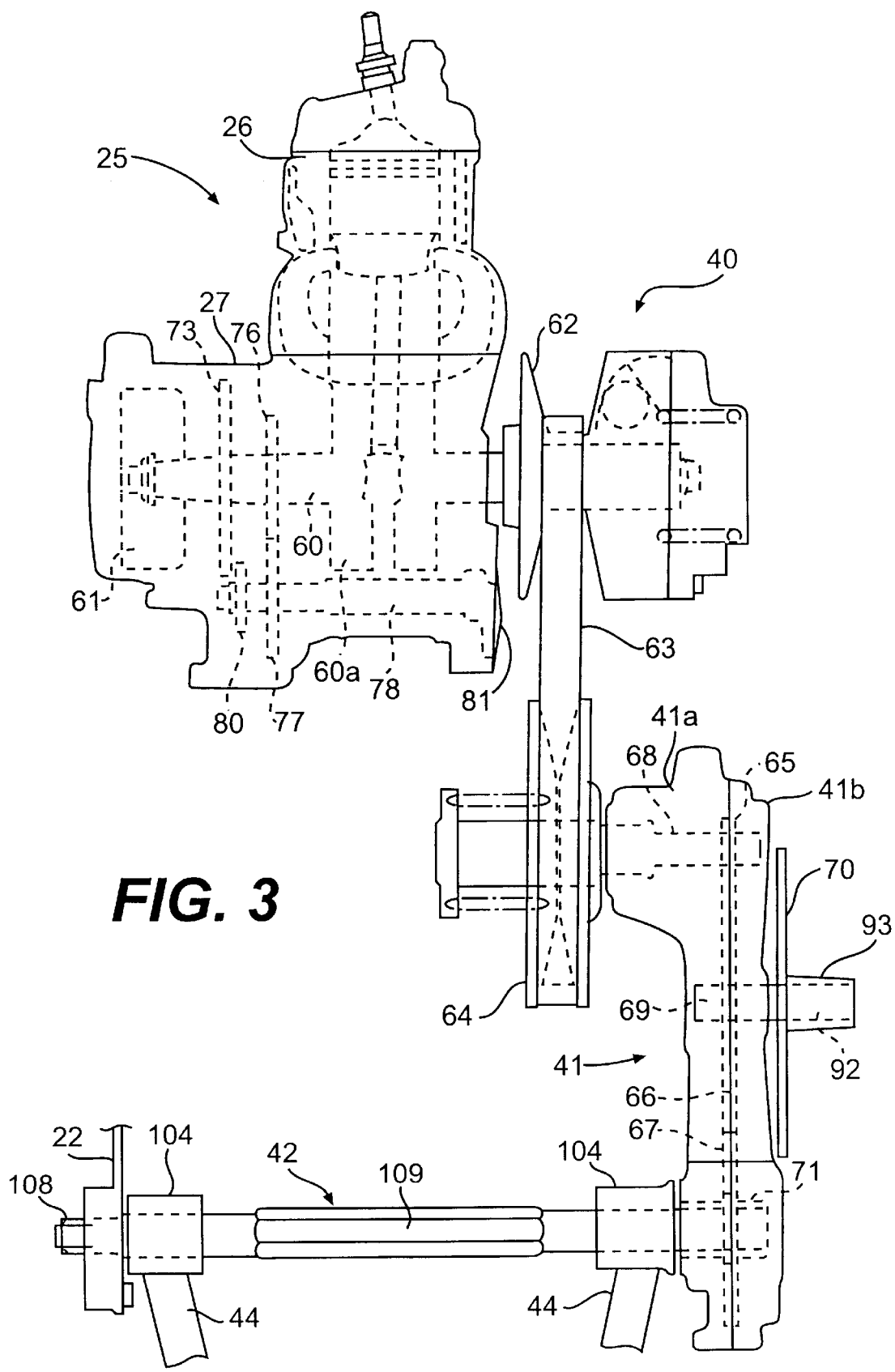
FIG. 3 is a schematic, developed, plan view of a drive/power transmission system.
Figure 4:
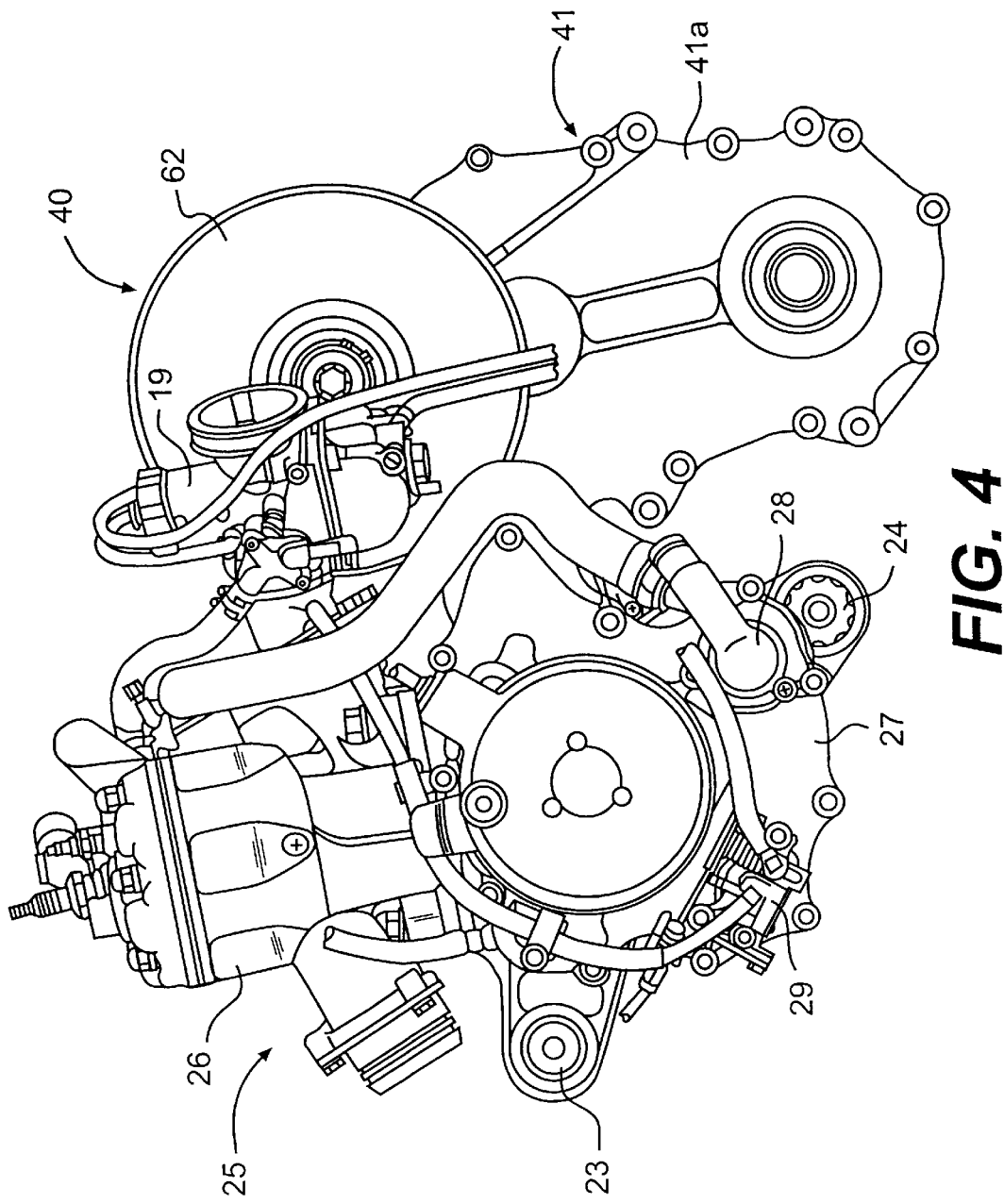
FIG. 4 is a left side view of the drive/power transmission system.
Figure 5:
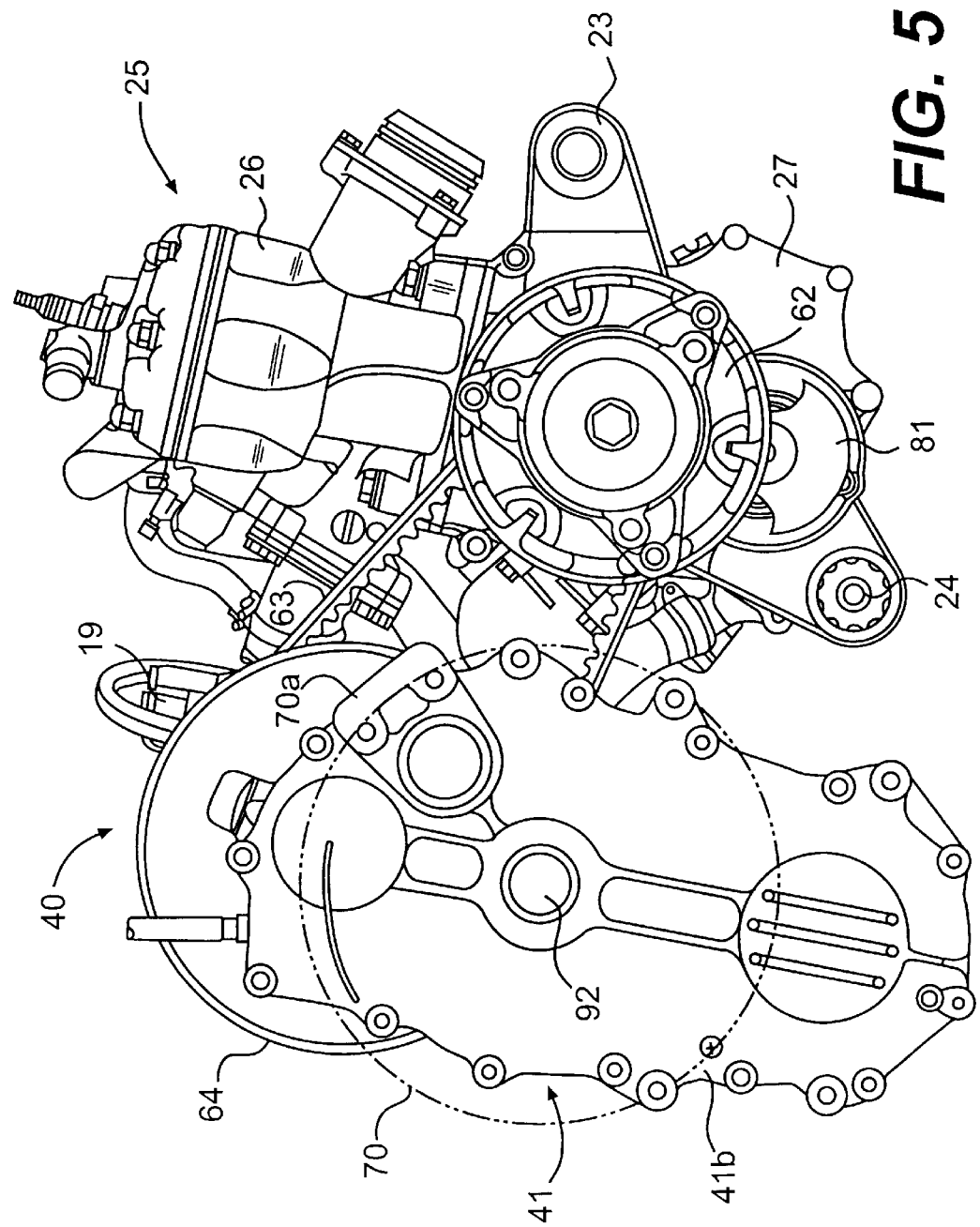
FIG. 5 is a right side view of the drive/power transmission system.

FIG. 3 shows a schematic configuration of the drive/power transmission system. Referring to FIG. 3, one end of a crankshaft 60 of the engine 25 is mounted with an ACG 61 and the other end thereof extends outwardly from the crankcase 27. A drive side pulley 62 of the V-belt transmission 40 is mounted to the extension of the crankshaft 60. In the V-belt transmission 40, a V-belt 63 is entrained around the drive side pulley 62 and a driven side pulley 64 disposed rearwardly and upwardly of the drive side pulley 62 (see FIGS. 3 and 5), to perform a primary continuously variable transmission of the rotational output of the crankshaft 60 to the gear box in a stepless manner.

Figure 7:
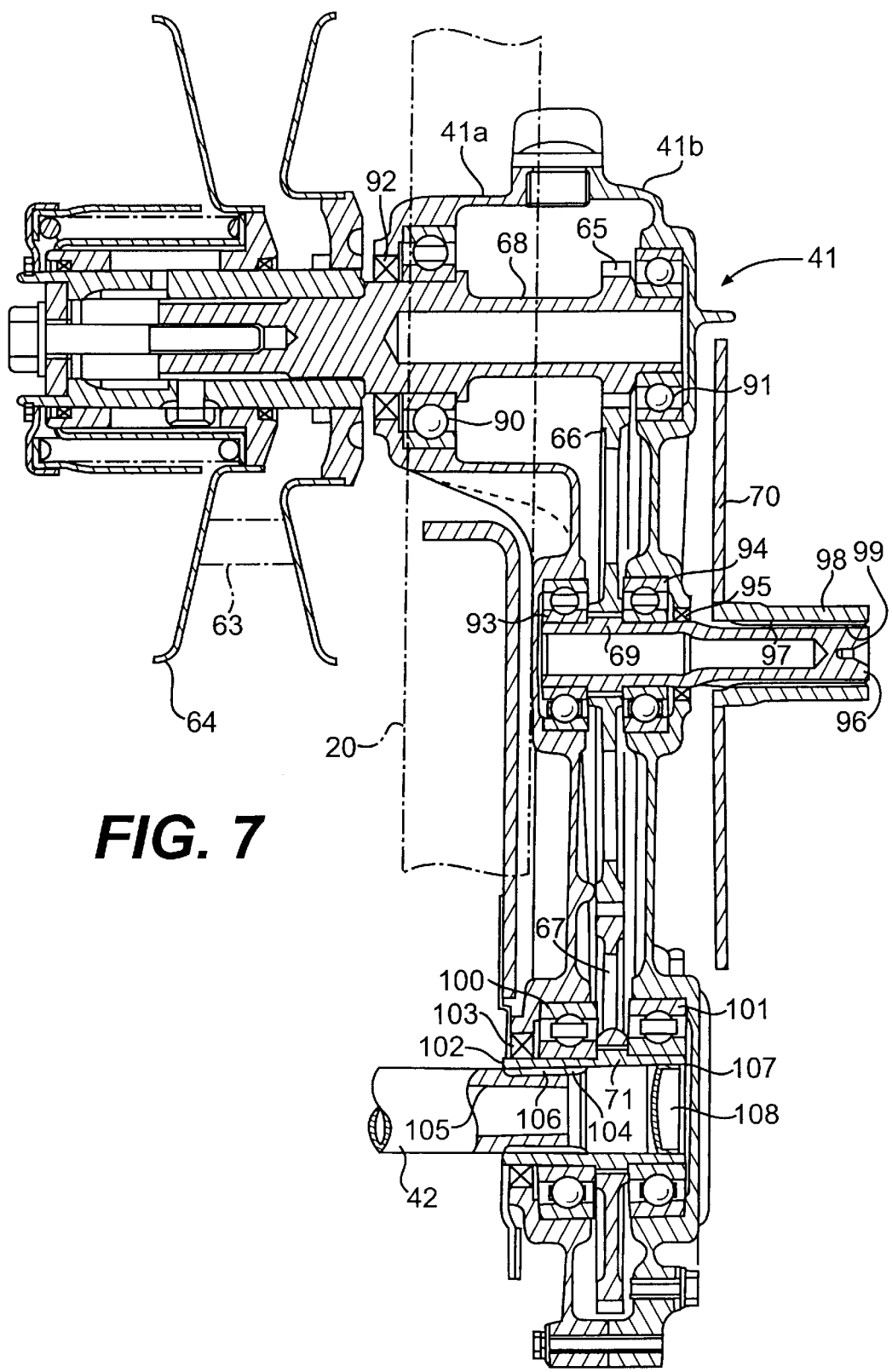
FIG. 7 is a sectional view of a driven pulley and a final reduction mechanism portion.

With respect to the arrangement of the parts constituting the drive/power transmission system, the gear box 41 is disposed rightward in the width direction of the body from the drive side pulley 62 of the V-belt transmission 40 and also rightward from the main frames 20 (see FIG. 7). The engine 25 and the V-belt transmission 40 are disposed inside the right and left main frames 20. The V-belt transmission 40 is located or sandwiched between the gear box 41 and the engine 25.

The gear box 41 includes a case composed of right and left halves 41b and 41a. A biaxial in-line gear train composed of an input gear 65, an idle gear 66 and a final gear 67 is contained in the case. An input shaft 68 mounted with the input gear 65 extends outwardly from the gear box 41. The driven side pulley 64 is mounted to the extension of the input shaft 68.

An idle shaft 69 mounted with the idle gear 66 extends outwardly from the gear box 41 opposite to the input shaft 68. A brake disk 70 is mounted to the extension of the idle shaft 69. The brake disk 70 is braked by a brake caliper 70a provided on the half case 41b of the gear box 41 (see FIG. 5).

A final shaft 71 is mounted with the final gear 67, and comprises a hollow shaft. One end of the drive shaft 42 is removably fitted into the final shaft 71. The gear box 41 having the gear train therein is filled with lubricating oil.

Figure 6:
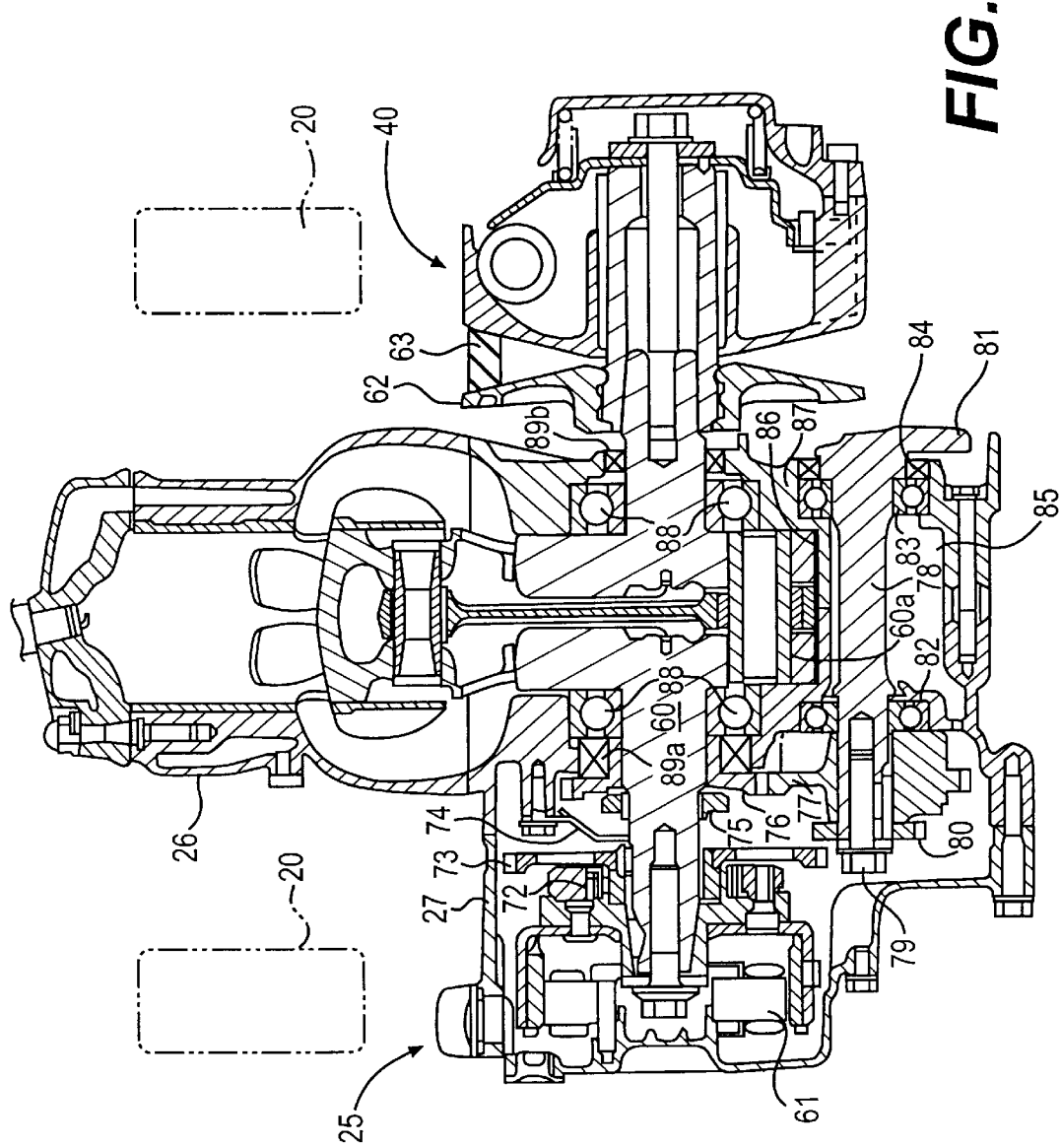
FIG. 6 is a sectional plan view of an engine portion.

Referring now to FIG. 6, a starter driven gear 73 is supported at a portion near the ACG 61 by the crankshaft 60 of the engine 25 through a one-way clutch 72. The movement of the starter driven gear 73 in the thrust direction is restricted by a gear presser plate 74. A balancer drive gear 76 is provided on the crankshaft 60 and fastened by a nut 75. The balancer gear 76 is meshed with a balancer driven gear 77 for rotating a balancer shaft 78 disposed parallel to the crankshaft 60.

A pump drive gear 80 is mounted on one end of the balancer shaft 78 with a bolt 79. A balancer weight 81 is integrally provided on the other end of the balancer shaft 78. Two intermediate portions of the balancer shaft 78 near the balancer driven gear 77 and the balancer weight 81 are rotatably supported on the crankcase 27 by bearings 82 and 83. A seal 84 is provided outside of the bearing 83 on the balancer weight 81 side.

A balancer chamber 85 for containing the balancer shaft 78 is partitioned, by a journal wall 87, from a, crank chamber 86 for containing a crank weight 60a of the crankshaft 60. The balancer driven gear 77 and the balancer weight 81 are disposed outside the crank chamber 86. The balancer chamber 85 is filled with lubricating oil in the crank case 27, and the bearings 82 and 83 are dipped in the oil. The balancer chamber 85 is sealed from the exterior with a seal 84.

The crankshaft 60 is rotatably supported, at a portion near the crank weight 60a, on a journal wall 87 by a bearing 88. The outside of the crank chamber 86 is sealed with seals 89a and 89b.

As will be apparent from FIG. 7, the input shaft 68 of the gear box 41 is rotatably supported by bearings 90 and 91. The extension of the input shaft 68 extending from the gear box 41 on the driven side pulley 64 side is provided with a seal 92.

The idle shaft 69 is similarly rotatably supported by bearings 93 and 94. The extension of the idle shaft 69 extending from the gear box 41 on the brake disk 70 side is provided with a seal 95. A spline groove 97 is formed in an outer peripheral portion of the extension portion 96. A boss 98 to be fitted around the outer periphery of the extension portion 96 is provided at a central portion of the brake disk 70. A spline groove 99 is formed in an inner peripheral surface of the boss 98, and is engaged with the spline groove 97, whereby the boss 98 is movable in the axial direction.

The final shaft 71 is similarly rotatably supported by bearings 100 and 101. The final shaft 71 is a hollow shaft with one end 102 being opened on a side surface of the gear box 41. A seal 103 is provided around the one end 102. A spline groove 104 is formed in an inner surface of the one end 102 to extend inwardly from the open end side.

One end 105 of the drive shaft 42 is fitted on the one end 102 side. A spline groove 106 formed in an outer peripheral portion of the one end 105 is engaged with the spline groove 104, allowing the final shaft 71 to be rotated integrally with the drive shaft 42. A cap 108 is fitted in the other end 107 of the final shaft 71 to seal the hollow final shaft 71. The cap 108 may be substituted by another sealing member, or the axial bore of the final shaft 71 may be formed in the shape of a cap.

Figure 8:
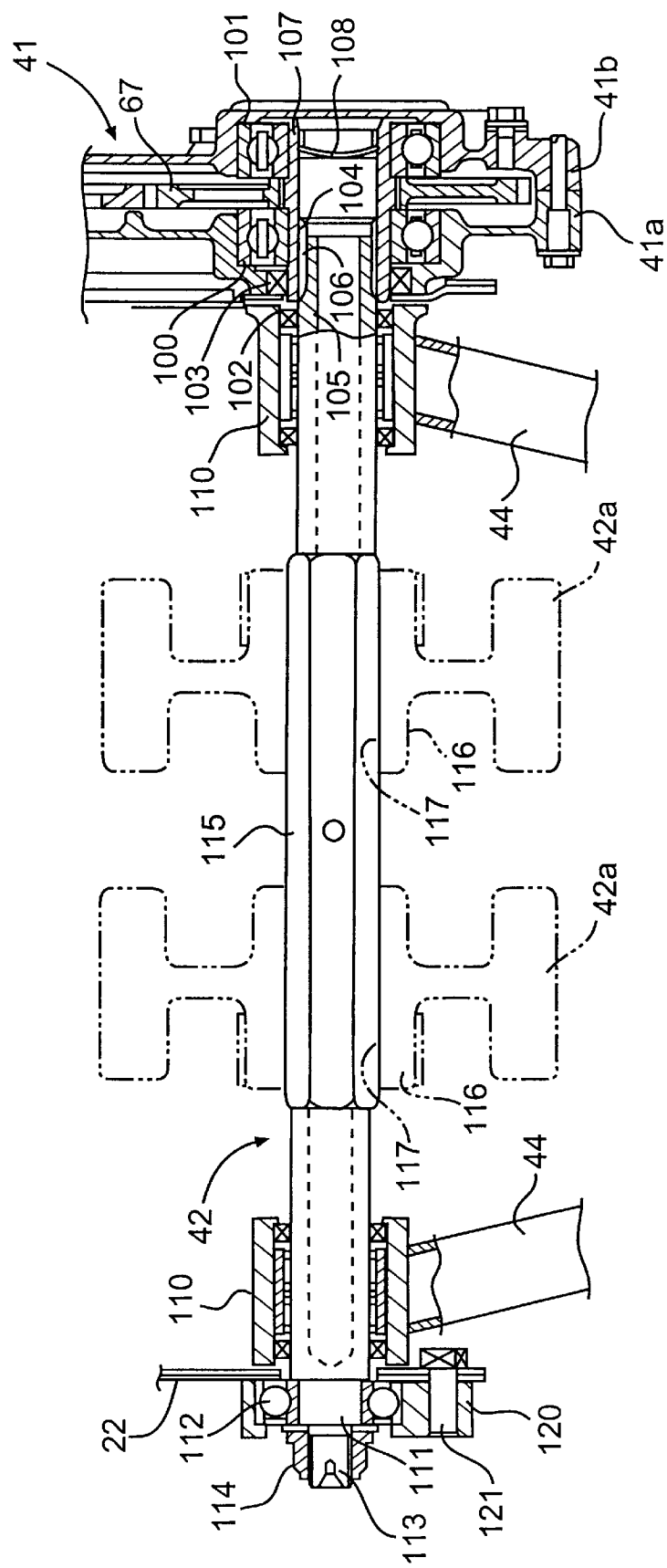
FIG. 8 is a sectional view showing a drive shaft supporting structure.

As shown in FIG. 8, both end portions of the drive shaft 42 pass through and are supported by bearing supporting portions 110 provided at front end portions of the right and left rear arms 44. The other end opposite to the one end 105 forms a small diameter portion 111 which is rotatably supported by a bearing 112 supported by the pivot plate 22. A leading end of the small diameter portion 111 forms a projecting threaded portion 113 which is fastened to the bearing 112 by a nut 114. The bearing 112 is fixed with a bolt 121 to the pivot plate 22 through a bearing holder 120.

An outer periphery of the intermediate portion of the drive shaft 42 is formed into a hexagonal portion 115 to be engaged with hexagonal holes 117 formed in centers of the boss portions 116 of the drive wheels 42a, whereby the drive wheels 52a are rotatable integrally with the drive shaft 42.

The operation of this embodiment will now be described, with particular reference to FIG. 8. The outer peripheral portion of the final shaft (output shaft) 71 is sealed with the seal 103. The final shaft 71 is a hollow shaft, and the inner surface of the final shaft 71 includes splines 104. Therefore, when one end 105 of the drive shaft 42 having splines 106 formed on its outer peripheral portion is inserted into the hollow portion of the final shaft 71, a removable spline connection is formed.

To install the drive shaft 42, all that is required is merely inserting one end 105 of the drive shaft having the splines 106 on its outer peripheral portion into the hollow portion of the final shaft 71, whereby both shafts can be connected together. Removal of the drive shaft 42 can also be performed easily and rapidly.

Because all of the bearings 90, 91, 93, 94, 100 and 101 are located within the gear box 41 and are immersed in oil, lubrication is easy and reliable.

In the present invention, one end 105 of the drive shaft 42 is splined to the final shaft 71, and the opposite end of the drive shaft 42 is supported by the bearing 112, which is in turn supported by the associated pivot plate 22. Further, the threaded portion 113 of the projecting front end is clamped to the bearing portion with the nut 114. Therefore, the drive shaft 42 is supported so as to prevent dislodgment thereof. Thus, mounting of the drive shaft 42 need be performed at only this opposite end side, and can therefore be performed easily and rapidly.

Moreover, since the drive shaft 42 serves as a drive shaft for driving the track belt 43 of the endless track unit 3 mounted in the snowmobile, the connection and separation between the gear box 41 and the endless track unit 3 can be performed freely and easily.

Additionally, since the hexagonal portion 115 formed at an intermediate position of the drive shaft 42 is engaged with the hexagonal hole 117 formed centrally in the boss portion 116 to permit integral rotation of the driving wheels 42a with the drive shaft 42, the connection between the driving wheels 42a and the drive shaft 42 becomes easy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission system comprising:
    a gear box including an input shaft, an idle shaft, and an output shaft;
    an input gear connected to said input shaft;
    an idle gear connected to said idle shaft, said idle shaft having a first end extending exteriorly of said gear box;
    a brake disk mounted on said first end of said idle shaft;
    an output gear connected to said output shaft;
    an oil seal for sealing an outer peripheral portion of the output shaft;
    the output shaft being a hollow member with an inner surface thereof having splines;
    a drive shaft having splines on an outer peripheral portion of a first end thereof, said first end being inserted and connected removably into the hollow portion of the output shaft;
    a bearing for supporting an end of said drive shaft opposite to the end connected to said output shaft, said bearing limiting axial movement of said drive shaft to prevent said drive shaft from being disengaged from said output shaft;
    a bearing support member for supporting said bearing; and
    a fastener attachable to said drive shaft for attaching the bearing to the drive shaft.

2. The power transmission system according to claim 1, wherein a cap member for sealing the hollow portion of the output shaft is fitted in the output shaft on a side opposite to the side where the drive shaft is inserted.

3. The power transmission system according to claim 1, wherein the drive shaft is a drive shaft for driving an endless track unit of a snowmobile.

4. The power transmission system according to claim 1, wherein said fastener is a nut threadable onto said drive shaft.

5. A power transmission system for a snowmobile comprising:
    a variable-ratio transmission having a drive pulley connectable to an output shaft of a power source, a driven pulley, and a flexible rotation transferring member rotationally coupling said drive pulley with said driven pulley;
    a gear box having an input gear, an idle gear, and an output gear therein;
    a connecting shaft connecting said driven pulley of said variable-ratio transmission to said input gear;
    an idle shaft connected to said idle gear and having a first end extending exteriorly of said gear box;
    a brake disk mounted on said first end of said idle shaft;
    an output shaft connected to said output gear;
    a drive shaft connected to said output shaft for driving an endless track unit of said snowmobile;
    said output shaft and said drive shaft each including a plurality of splines interengaged with one another to transmit rotation of said output shaft to said driveshaft;
    a bearing for supporting an end of said drive shaft opposite to the end connected to said output shaft, said bearing limiting axial movement of said drive shaft to prevent said drive shaft from being disengaged from said output shaft;
    a bearing support member for supporting said bearing; and
    a fastener attachable to said drive shaft for attaching the bearing to the drive shaft.

6. The power transmission system according to claim 5, wherein the output shaft is a hollow member with the plurality of splines being located on an inner surface thereof, and the plurality of splines on the drive shaft are located on an outer peripheral portion of a first end thereof.

7. The power transmission system according to claim 5, wherein said fastener is a nut threadable onto said drive shaft.

8. A snowmobile comprising:
    a body;
    a steering ski supported on a front portion of the body;
    a track device suspended from a rear portion of the body;
    an engine supported on the body at a position between said steering ski and said track device, said engine having an output shaft extending outwardly from a lateral side thereof;
    a variable-ratio transmission having a drive pulley connected to said output shaft of said engine, a driven pulley, and a rotation transferring member rotationally coupling said drive pulley with said driven pulley;
    a gear box having an input gear, an idle gear, and an output gear therein;
    a connecting shaft connecting said driven pulley of said variable-ratio transmission to said input gear;
    an idle shaft connected to said idle gear and having a first end extending exteriorly of said gear box;
    a brake disk mounted on said first end of said idle shaft;
    an output shaft connected to said output gear;
    a drive shaft connected to said output shaft for driving said track device;
    said output shaft and said drive shaft each including a plurality of splines interengaged with one another to transmit rotation of said output shaft to said drive shaft;

a bearing for supporting an end of said drive shaft opposite to the end connected to said output shaft, said bearing limiting axial movement of said drive shaft to prevent said drive shaft from being disengaged from said output shaft;

a bearing support member for supporting said bearing; and a fastener attachable to said drive shaft for attaching the bearing to the drive shaft.

9. The snowmobile according to claim 8, wherein the output shaft is a hollow member with the plurality of splines being located on an inner surface thereof, and the plurality of splines on the drive shaft are located on an outer peripheral portion of a first end thereof.

10. The snowmobile according to claim 8, wherein said fastener is a nut threadable onto said drive shaft.

* * * * *